United States Patent
Schäfer

(10) Patent No.: US 8,056,964 B2
(45) Date of Patent: Nov. 15, 2011

(54) FRONT BODY FOR A MOTOR VEHICLE

(75) Inventor: Joachim Schäfer, Darmstadt (DE)

(73) Assignee: GM Global Technology Operations LLC, Detroit, MI (US)

( * ) Notice: Subject to any disclaimer, the term of this patent is extended or adjusted under 35 U.S.C. 154(b) by 66 days.

(21) Appl. No.: 12/256,368

(22) Filed: Oct. 22, 2008

(65) Prior Publication Data
US 2009/0108627 A1    Apr. 30, 2009

(30) Foreign Application Priority Data
Oct. 24, 2007    (DE) .......................... 10 2007 050 650

(51) Int. Cl.
*B60J 7/00*    (2006.01)
(52) U.S. Cl. ................................. 296/203.02
(58) Field of Classification Search ............ 296/203.02, 296/187.03, 187.09, 193.09, 187.04; 293/136, 293/132, 102, 133, 120, 121, 122, 155, 109; 224/532; 180/274
See application file for complete search history.

(56) References Cited

FOREIGN PATENT DOCUMENTS

| DE | 10002499 A1 | 3/2001 |
|---|---|---|
| DE | 102004021800 A1 | 12/2005 |
| DE | 102004024987 A1 | 12/2005 |
| DE | 102005020413 A1 | 11/2006 |
| DE | 102005056961 A1 | 6/2007 |
| FR | 2897812 A1 | 8/2007 |
| JP | 58030874 A | 2/1983 |
| JP | 11034771 A | 2/1999 |
| JP | 11314552 A | 11/1999 |
| JP | 2003081034 A | 3/2003 |
| JP | 2006264495 A | 10/2006 |

OTHER PUBLICATIONS

British Patent Office, British Search Report for Application No. 0818840.1, dated Dec. 23, 2008.
German Patent Office, German Search Report for Application No. 102007050650.5, dated Mar. 25, 2009.
China Patent Office, Chinese Office Action for Application No. 2008101693628, dated Feb. 12, 2010.
China Patent Office, Chinese Office Action for Application No. 200810169362.8, dated Jul. 12, 2010.

*Primary Examiner* — Kiran B. Patel
(74) *Attorney, Agent, or Firm* — Ingrassia Fisher & Lorenz, P.C.

(57) ABSTRACT

A front body for a motor vehicle includes, but is not limited to a bumper carrier and a hood lock carrier that are solidly connected to one another. An energy absorber structure that is supported on the bumper carrier on one side and on the whole block carrier on the other side features ribs that extend between the lock carrier and the bumper carrier and are essentially oriented in the longitudinal direction of the vehicle.

10 Claims, 2 Drawing Sheets

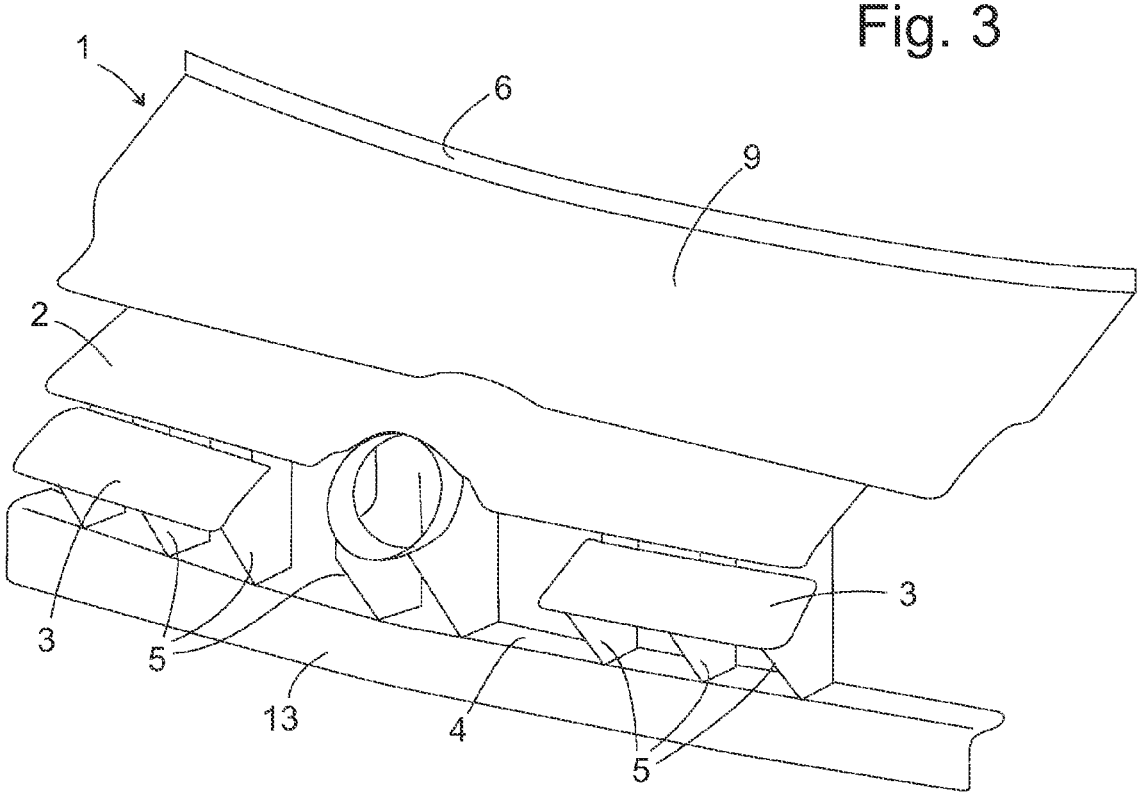
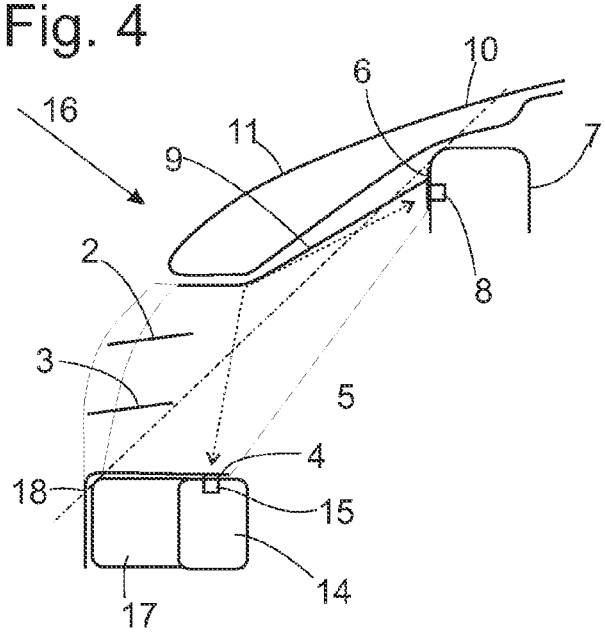

FRONT BODY FOR A MOTOR VEHICLE

CROSS-REFERENCE TO RELATED APPLICATION

This application claims priority to German Patent Application No. 102007050650.5, filed Oct. 24, 2007, which is incorporated herein by reference in its entirety.

TECHNICAL FIELD

The technical field pertains to a front body for a motor vehicle with a bumper carrier and a hood lock carrier that are solidly connected to one another.

BACKGROUND

The bumper carrier and the hood lock carrier generally provide a significant contribution to the rigidity of the front section of a motor vehicle body and are designed for absorbing substantial deformation energy in case of a collision with another vehicle. However, this means that they are generally not significantly deformed during a collision with a pedestrian. In order to also protect pedestrians, it is necessary to arrange regions that are easier to deform in front of these two carriers, and these regions are deformed during a collision with a pedestrian and able to absorb the pedestrian's impact energy.

DE 10 2005 020413 A1 discloses a front body for a motor vehicle, in which a radiator grille is supported on a bumper carrier and a front element that is not described in detail. Since the radiator grille in itself is rigid, it is proposed to provide a flexible ledge with a flexible undercut region on an upper edge of the radiator grille with a bellows that collapses during a collision with a pedestrian and therefore allows a pivoting movement of the otherwise rigid radiator grille. Since this edge region has small dimensions in comparison with the entire radiator grille, it is difficult to provide this edge region with a sufficient energy absorption capacity that fulfills the legal requirements with respect to the protection of pedestrians.

Attempts to ensure a sufficient protection of pedestrians have resulted in front body constructions, in which the hood lock carrier is set back relative to the bumper carrier and an edge of the hood that protrudes over the hood lock carrier can be deformed with relative ease in order to yield in case of a collision with a pedestrian and to thusly decelerate the pedestrian. Although it was determined that the hood respectively yields with relative ease at the beginning of the deformation, the deformation resistance increases significantly as the deformation progresses. In order to improve the protection of pedestrians, it would be desirable to reduce the dependence of the deformation resistance on the extent of the deformation.

The invention aims to develop a front body for a motor vehicle that ensures an effective protection of pedestrians with simple means and solves or at least diminishes one or another of the above-described problems. In addition, other aims, desirable features, and characteristics will become apparent from the subsequent summary and detailed description, and the appended claims, taken in conjunction with the accompanying drawings and this background.

SUMMARY

This aim, other aims, desirable features, characteristics, and objectives are attained in that a front body for a motor vehicle with a bumper carrier and a hood lock carrier that are solidly connected to one another is provided with an energy absorber structure that is supported on the bumper carrier on one side and on the hood lock carrier on the other side, and this energy absorber structure features a plurality of ribs that extend between the hood lock carrier and the bumper carrier and are essentially oriented in the longitudinal direction of the vehicle. Since the ribs are essentially oriented in the longitudinal direction of the vehicle, they also extend essentially parallel to an impact force that acts upon the ribs in case of a collision with a pedestrian. Due to this orientation, the ribs have a significant rigidity, particularly at the beginning of their deformation, such that they already begin to effectively decelerate the pedestrian when they are only slightly deformed. The collapsing of the ribs during the course of a collision continuously absorbs energy such that the pedestrian is also efficiently decelerated during the deformation process.

The embodiment of the invention with the rib construction can be used in a particularly advantageous fashion in a front body, the hood lock carrier of which is set back relative to the bumper carrier.

An edge region of the hood that protrudes forward over the hood lock carrier is preferably supported by the energy absorber structure such that a pedestrian impacting thereon is not only decelerated due to the rigidity of the hood edge region, but also the ribs situated there under.

In order to ensure a continuous deformation resistance of the energy absorber structure during the entire deformation process, the energy absorber structure preferably features crosspieces that connect the ribs to one another. These crosspieces can also dissipate energy due to their deformation or they may reinforce individual ribs by coupling these ribs to adjacent ribs.

In order to evenly introduce the pressure of the hood into the energy absorber structure, it is practical that one of the crosspieces supports the front edge region of the hood.

With respect to the stabilization of the energy absorber structure, it is also practical that at least one of the crosspieces adjoins one of the carriers, namely the hood lock carrier or the bumper carrier.

This crosspiece may be advantageously fixed on the carrier by means of a plug-in connection.

In order to efficiently introduce an impact force acting upon the ribs into the carriers, it is practical that the ribs protrude over a line connecting the hood lock carrier and the bumper carrier in a longitudinal section.

The entire energy absorber structure can be realized in the form of a one-piece molded plastic part.

BRIEF DESCRIPTION OF THE DRAWINGS

The present invention will hereinafter be described in conjunction with the following drawing figures, wherein like numerals denote like elements.

FIG. 3 shows an energy absorber structure according to a second embodiment of the invention in the form of a representation analogous to FIG. 1, and FIG. 4 shows a section analogous to FIG. 2 through a front body with the energy absorber structure according to FIG. 3.

DETAILED DESCRIPTION

The following detailed description is merely exemplary in nature and is not intended to limit the application and uses.

Furthermore, there is no intention to be bound by any theory presented in the preceding summary and background or the following detailed description.

Figure 1:
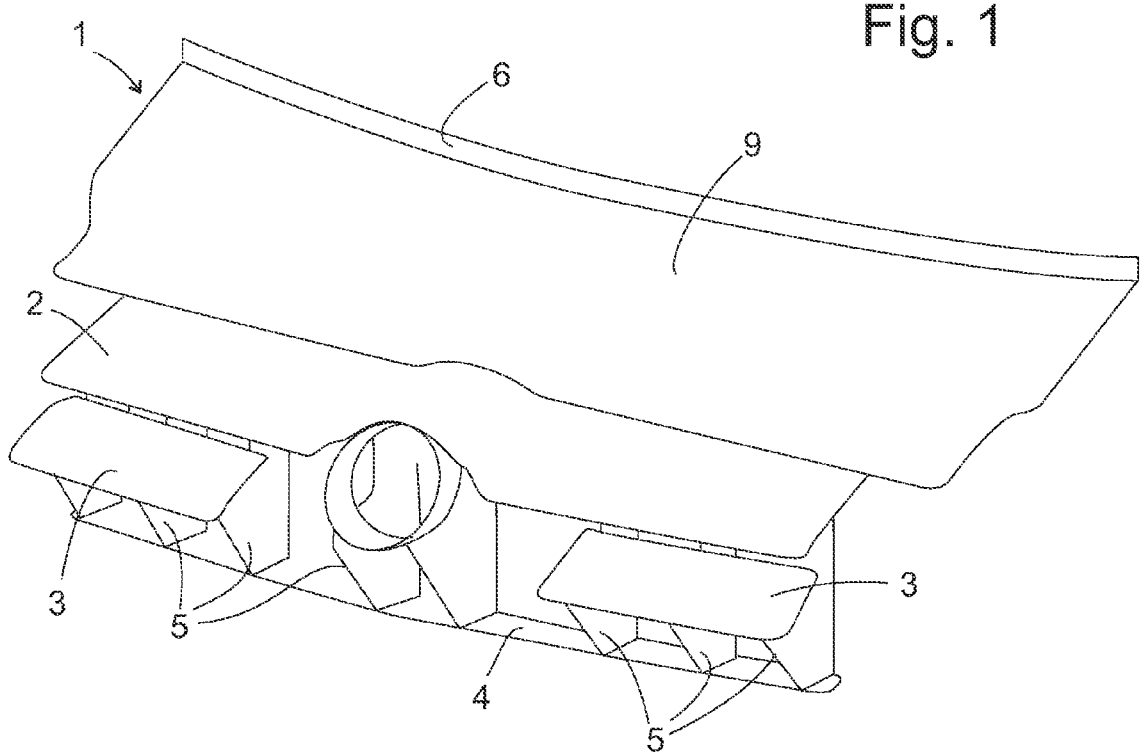
FIG. 1 shows a perspective representation of an energy absorber structure for a front body according to a first embodiment of the invention.

The energy absorber structure illustrated in the form of a perspective representation in FIG. 1 has an injection-molded plastic part. It comprises a plurality of crosspieces 1 to 4 that extend in the direction of the width of the vehicle and mutually connect a plurality of vertical ribs 5, preferably about 8 to 12 of these ribs. The upper crosspieces 1 to 3 are sloped forward similar to a roof, the top crosspiece 1 features an abutment shoulder 6 to be mounted on a front side of a hood lock carrier 7 (see FIG. 2). Snap-in pins 8 integrally molded onto the rear side of the abutment shoulder 6 anchor the abutment shoulder 6 in corresponding recesses of the hood lock carrier 7.

Figure 2:
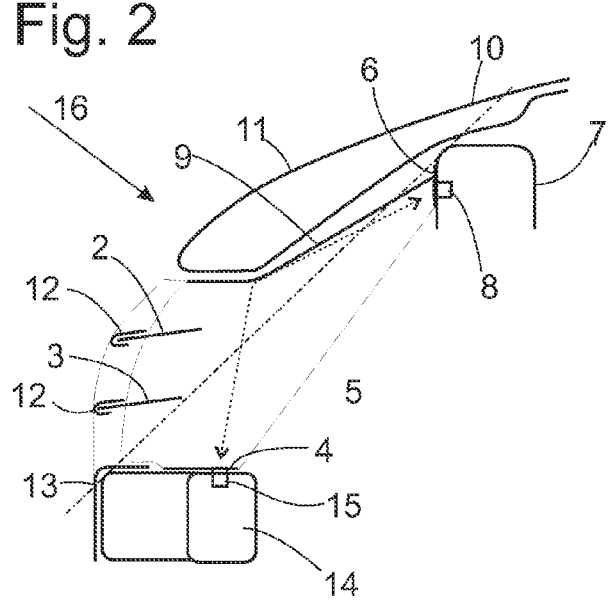
FIG. 2 shows a schematic longitudinal section through a front body with the energy absorber structure according to FIG. 1.

FIG. 2 also shows that the sloping principal surface 9 of the crosspiece 1 essentially follows the outside contour of the vehicle body that is convexly sloped in a region situated in front of the hood lock carrier 7. The principal surface 9 extends slightly underneath a front edge region 10 of an engine compartment hood 11 that protrudes over the hood lock carrier 7.

On their front edge, the crosspieces 2, 3 respectively support ledges 12 of a molded, shell-like plastic bumper covering 13. Since the ribs 5 are oriented parallel to the driving direction and the crosspieces 2, 3 are respectively arranged in the slipstream of the ledges 12, the energy absorber structure does not impair the flow behavior of cooling air flowing between the ledges 12 such that the efficiency of a (not-shown) radiator arranged behind the energy absorber structure remains unaffected.

The bumper covering 13 is fixed on a bumper carrier 14 that transversely extends over the entire width of the vehicle front section analogous to the hood lock carrier 7 and is solidly connected to a rigid frame by means of not-shown crash boxes.

The bumper carrier 14 also supports the lower crosspiece 4 of the energy absorber structure that is anchored therein with the aid of snap-in pins 15.

When a pedestrian impacts on the front body during an accident, a force acts upon the end region 10 of the hood in the approximate direction of the arrow 16 in FIG. 2. Since the hood is not supported in the edge region 10 lying in front of the hood lock carrier 7, this edge region 10 on its own yields quite easily. However, a slight deformation suffices for bringing the edge region 10 in contact with the upper crosspiece 1 of the energy absorber structure in order to thusly introduce the impact forces into the energy absorber structure. The ribs 5 consequently are subjected to a force that acts parallel to their principal surfaces. The ribs 5 have a high load carrying capacity in this direction such that an effective deceleration of the pedestrian already sets in when the front body is slightly deformed.

Within the ribs 5, the impact force is distributed over the two carriers 7, 14 as indicated by the arrows drawn with broken lines in FIG. 2. This means that a rear region of the ribs is subjected to tension during an impact; consequently, the ribs essentially can only give way by laterally yielding and creasing in a front region that essentially lies in front of and above a line that connects the carriers 7, 14 and is drawn with dot-dash lines in FIG. 2. In this front region, the ribs 5 are connected to one another by the crosspieces 2, 3 such that a lateral excursion of a rib 5 is transmitted to the adjacent ribs by the crosspieces 2, 3. Even if the hood 11 is only locally indented by the impact, the resulting deformation is distributed over the entire energy absorber structure such that an effective deceleration is achieved regardless of the location of the impact.

Practical tests have demonstrated that the above-described energy absorber structure made it possible to more than double the duration of the deceleration process of a thigh impactor fired at the front body of the motor vehicle, namely from about 10 ms to 22 ms when measured in the form of the half intensity width of the deceleration force curve, and to almost halve the peak value of the deceleration force from about 9 to about 5 kN.

FIG. 3 and FIG. 4 show a second embodiment of the invention that essentially can be distinguished from the embodiment according to FIG. 1 and FIG. 2 in that the bottom crosspiece 4 is, in contrast to the embodiment according to FIG. 1, widened toward the front and provided with a skirt 18 that is suspended from the front and covers a bumper carrier 14 and a layer 17 of foamed material arranged in front of the bumper carrier 14. In other words, the functions of the bumper covering 13 and of the energy absorber structure according to the first embodiment are combined in a one-piece molded plastic part that spans the intermediate space between the bumper carrier 14 and the hood lock carrier 7. The ledges 12 are eliminated in this case. The collision characteristics of this front body are identical to that of the body according to FIG. 1 and FIG. 2; however, the assembly is simplified due to the elimination of a bulky component.

While at least one exemplary embodiment has been presented in the foregoing summary and detailed description, it should be appreciated that a vast number of variations exist. It should also be appreciated that the exemplary embodiment or exemplary embodiments are only examples, and are not intended to limit the scope, applicability, or configuration in any way. Rather, the foregoing detailed description will provide those skilled in the art with a convenient road map for implementing an exemplary embodiment, it being understood that various changes may be made in the function and arrangement of elements described in an exemplary embodiment without departing from the scope as set forth in the appended claims and their legal equivalents.

What is claimed is:

1. A front body for a motor vehicle, comprising:
 a bumper carrier;
 a lock carrier; and
 an energy absorber structure coupled between the bumper carrier and the lock carrier, wherein said energy absorber structure comprises:
 a plurality of ribs extending between the lock carrier and the bumper carrier and essentially oriented in a longitudinal direction of the motor vehicle; and
 a plurality of crosspieces connecting the plurality of ribs.

2. The front body according to claim 1, wherein the lock carrier is set back relative to the bumper carrier.

3. The front body according to claim 1, further comprising a hood comprising a front edge region that protruding forward over the lock carrier and supported by the energy absorber structure.

4. The front body according to claim 3, wherein the front edge region protrudes over a line that connects the lock carrier and the bumper carrier in a longitudinal section.

5. The front body according to claim 1, wherein at least one of the plurality of crosspieces supports a front edge region of a hood.

6. The front body according to claim 1, wherein at least one of the plurality of crosspieces abuts at least one of the bumper carrier and the lock carrier.

7. The front body according to claim 6, wherein at least one of the plurality of crosspieces is fixedly coupled to at least one of the bumper carrier and the lock carrier with a plug-in connection.

8. The front body according claim 1, wherein the plurality of ribs protrude over a line that connects the lock carrier and the bumper carrier in a longitudinal section.

9. The front body according to claim 1, wherein the energy absorber structure consists of a one-piece molded plastic part.

10. The front body according to claim 1, wherein the energy absorber structure and a bumper covering that covers the bumper carrier are combined into one structural unit.

* * * * *